Aug. 17, 1943.  J. F. CLEARY  2,327,095
BOX
Filed May 22, 1939  2 Sheets-Sheet 1
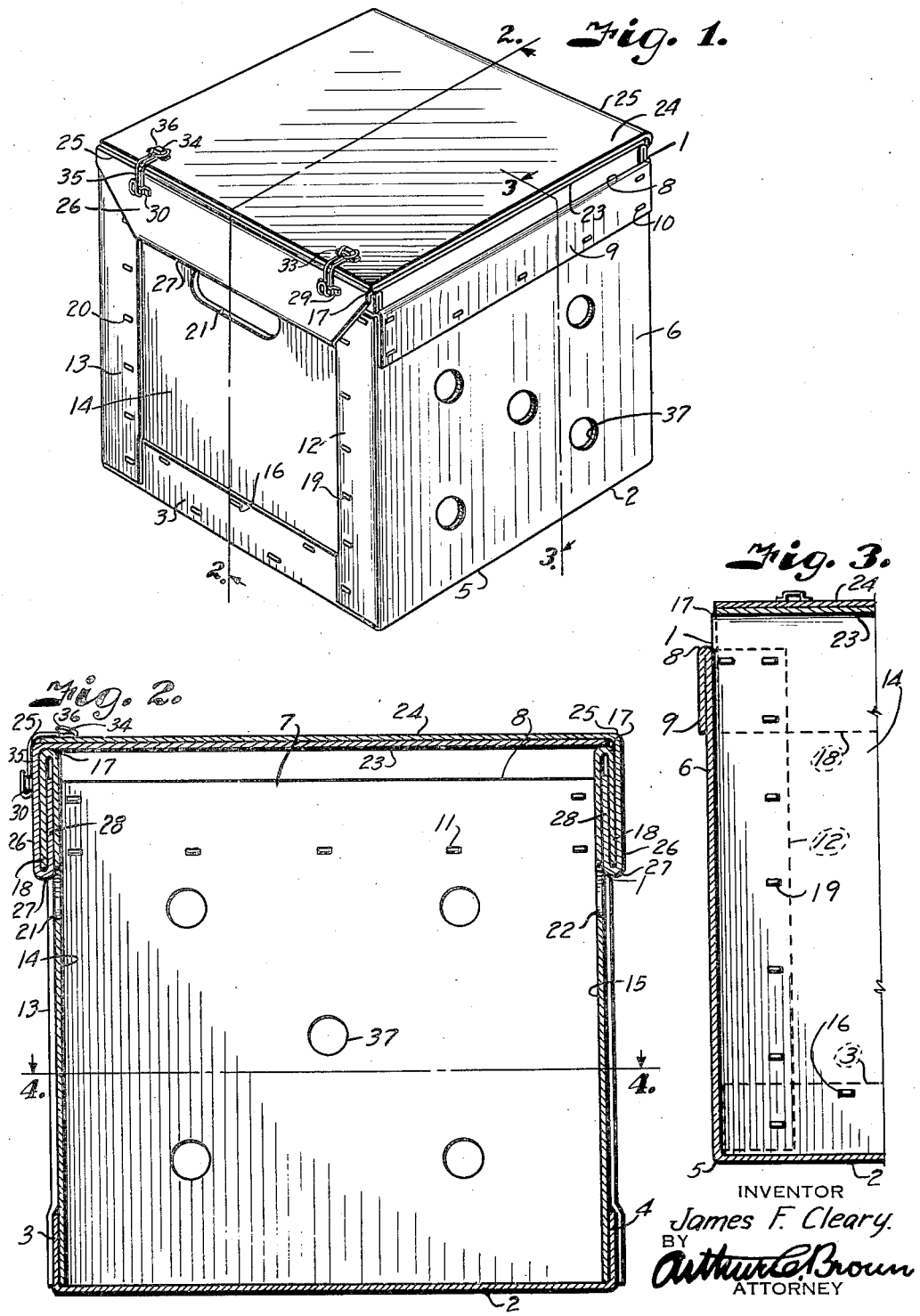
INVENTOR
James F. Cleary.
BY
Arthur C. Brown
ATTORNEY Aug. 17, 1943.   J. F. CLEARY   2,327,095
BOX
Filed May 22, 1939   2 Sheets-Sheet 2
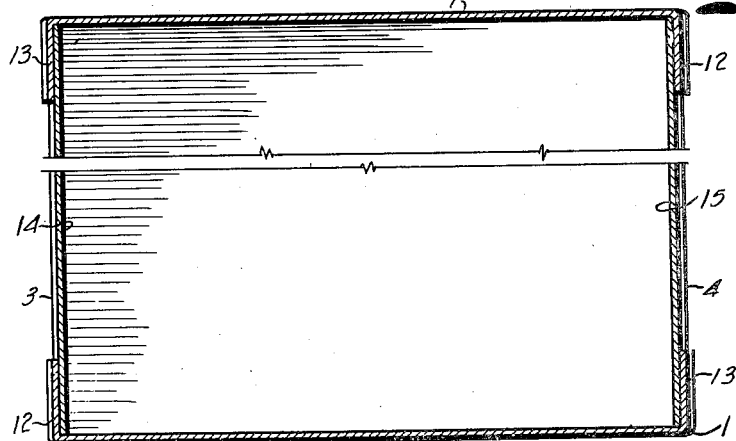
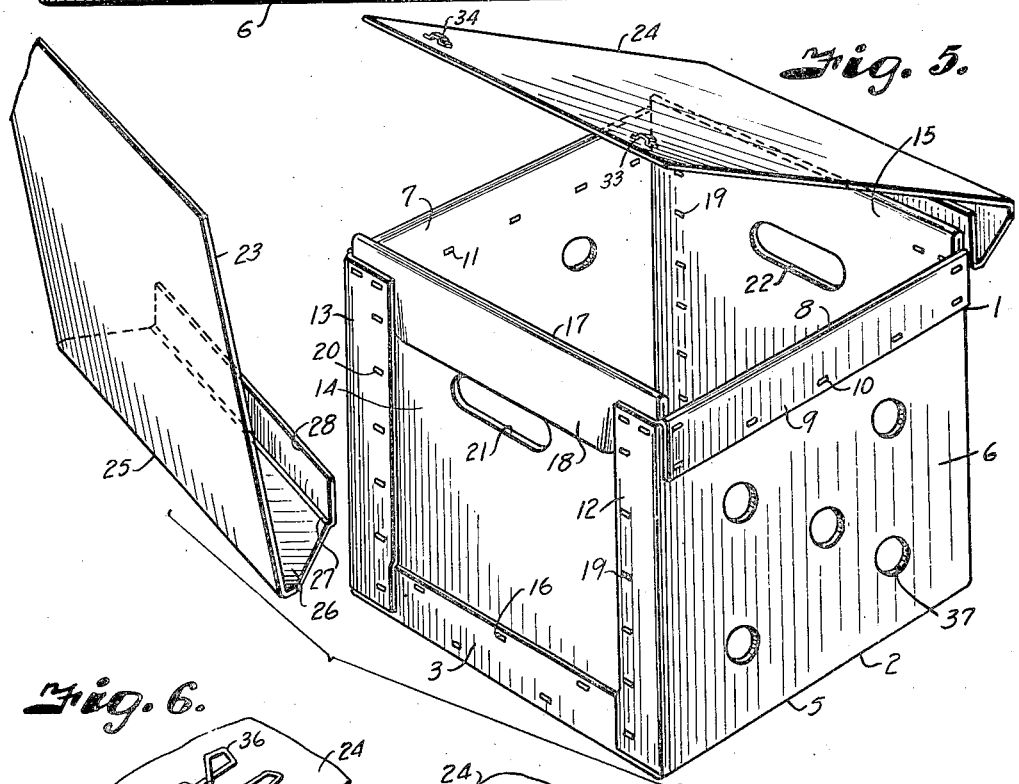
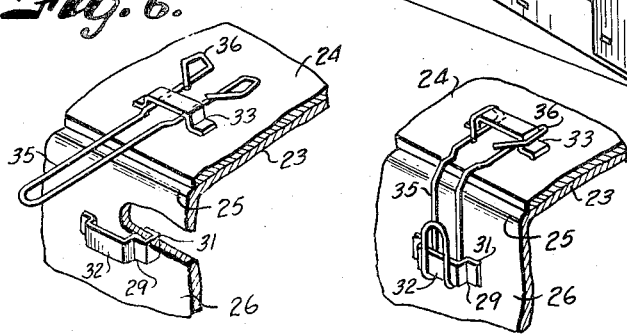
INVENTOR
James F. Cleary.
BY
Arthur E. Brown
ATTORNEY Patented Aug. 17, 1943

2,327,095

UNITED STATES PATENT OFFICE 2,327,095

BOX

James F. Cleary, Kansas City, Mo.

Application May 22, 1939, Serial No. 274,978

2 Claims. (Cl. 229—23)

This invention relates to boxes and more particularly to shipping boxes for fruit, eggs and similar commodities, the principal object of the invention being to provide strong boxes for this purpose arranged to be formed of corrugated, or solid fibre, or other composite board.

Other objects of the invention are to provide improved closures for shipping boxes together with improved arrangements for securing the closures for the boxes thereto; to provide a box which is free of projecting edges interiorly thereof; to provide a box construction which facilitates handling the boxes while being packed or in transit; to provide a box construction which provides close packing of commodities without damaging thereof; to provide packing boxes with removable covers that are readily applied and securely retained in position; to provide reinforcements for the portions of the boxes normally receiving the greatest strain and to reduce to a minimum unsupported areas; to provide for ventilation and expansion of commodities packed in the boxes; and to provide boxes of relatively light weight which are economical and efficient for their intended purpose.

In accomplishing these and other objects of the present invention, I have provided improved details of structure, the preferred form of which is illustrated in the accompanying drawings, wherein:

Fig. 1 is a perspective view of a box constructed in accordance with the present invention.

Fig. 2 is a detail vertical cross-section through the box illustrated in Fig. 1 substantially on the line 2—2, Fig. 1.

Fig. 3 is a fragmentary vertical cross-section through the box illustrated in Fig. 1 on the line 3—3, Fig. 1.

Fig. 4 is a horizontal section through the box illustrated in Fig. 1 substantially on the line 4—4, Fig. 2, particularly illustrating the plane surfaces of the interior of the box.

Fig. 5 is a detail perspective view of a box constructed in accordance with the present invention, the closure members therefor being shown in disassembled spaced relation for better illustrating their construction.

Fig. 6 is a fragmentary perspective view of a portion of a box provided with fastening devices, the fastening devices being shown in disengaged relation.

Fig. 7 is a view somewhat similar to Fig. 6 showing the fastening devices in engaged relation.

Referring more in detail to the drawings:

1 designates a box constructed in accordance with the present invention and which is designed for utilization as a shipping box for commodities such, for example, as citrus or like fruits, eggs and the like, the box preferably being formed of paper, fibre or like board.

The box 1 preferably consists of a bottom wall 2, Fig. 2, having upturned flanges 3 and 4 at its opposite ends. The sides of the bottom wall 2 are preferably turned upwardly on a fold line 5, Fig. 3, and extend to a suitable height to form side walls 6 and 7 for the box. The upper ends of the side walls are preferably turned outwardly and downwardly on a fold line 8, Fig. 3, to form side flanges 9 which may be stapled or otherwise secured as at 10 and 11 to the respective side walls of which they form a part for bracing the upper ends of the side walls. The side walls are also preferably provided with vertically arranged flanges 12 and 13, Fig. 5, on their end edges, the said side wall flanges being arranged to conveniently overlap the upturned bottom wall end flanges, as clearly shown in Figs. 1 and 5.

End walls 14 and 15 are provided for the box, which are preferably of a material similar to the bottom and side walls and which consist of blanks having their lower ends secured, as by stapling 16, on the inner faces of the bottom wall end flanges in such a manner that the interior surfaces of the box are of substantially plane character and thus do not mar the commodities packed in the box. The end walls 14 and 15 are also preferably of a length adapting the upper ends thereof to be folded outwardly and downwardly on a fold line 17 above the fold lines 8 of the side wall flanges to provide downturned pocket flanges 18 on the outer faces of the end walls.

With the end walls so arranged in relation to the bottom wall and the flanges thereon, the end flanges 12 and 13 on the side walls may be folded over the outer faces of the end walls, their downturned pocket flanges and the upturned bottom wall flanges to be secured in such relation in a suitable manner, as by stapling 19 and 20.

Apertures 21 and 22 are preferably provided in the end walls of the box to facilitate handling thereof, the apertures preferably being substantially horizontally arranged and of a length sufficient to enable easily grasping the box and lifting the same. The apertures are also preferably of a height providing for their extension slightly above the lower edges of the downturned flanges 18 on the end walls of the box. With this construction, it is apparent that the flanges 18 and the upper edges of the apertures forming part of the end walls proper of the box cooperate in supporting the load in the box at such times as the box is lifted.

23, Fig. 5, designates a closure member cooperable with a substantially duplicate closure member 24 for closing the interior of the box. Each closure member preferably includes a body portion having a surface area of approximately that of the opening at the upper end of the box. One end of each closure member is folded as at 25 downwardly to form an end wall engaging member 26 of a width approximately that of the downturned end wall flanges 18.

The members 26 are also provided with a fold line 27 to provide tuck flanges 28 at the extreme outer portion of one end of the closure members when said members are folded. As shown in Fig. 1, the members 26 are tapered inwardly from the folds 26 to the folds 27 to reduce the tuck flanges 28 to a size sufficient to engage in the pockets formed between the flanges 18 of the end walls and the end walls proper within the limits defined by the inner edges of the side wall end flanges 12 and 13.

In practice, the tuck flanges 28 are engaged within the pockets formed by the end wall flanges 18, whereupon the closures are bent in such a manner that the members 26 thereof engage over the outer faces of the flanges 18, the closure members being further bent in such a manner as to rest on the fold line 17 of the end wall flanges at both ends of the box and thus bridge the interior of the box in overlapping relation to each other, as clearly shown in Figs. 1 and 2, it being apparent that the lower face of the lower closure body portion is spaced above the upper edges of the downturned side wall flanges to thus allow for ventilation and expansion of articles packed in the box.

In order to maintain the closure members in overlapped box closing condition, the member 23 of one of the closures is preferably provided with spaced fastening devices 29 and 30 which are preferably in the form of staples, as shown in Figs. 6 and 7, and preferably include hook-like ends 31, Fig. 6, engaged with the members 26 and having midportions 32 spaced outwardly from the outer face of the members 26. Fastening devices 33 and 34, which are preferably substantially duplicates of the fastening devices 29 and 30, may then be mounted on the end of the other closure member adjacent the first-named fastening devices when the closures are in overlapped relation, as shown in Fig. 1. Fastening devices 35, which are matable with the staples, are then employed to interconnect the fastening devices 29—30 and 33—34, the fastening devices 35 preferably consisting of substantially U-shaped wire or the like having outwardly rearwardly and then inwardly turneds ends 36 arranged in overlapping relation to the body proper of the fastening device on one side thereof. The fastening devices 35 constitute clip-like hook elements and are preferably resilient to a predetermined point of deformation and adapted to maintain the shape given them after they have been bent beyond such predetermined point of deformation, as shown in Fig. 7.

As a matter of practice, it has been found desirable to provide the side walls of the box with air holes 37 for providing adequate ventilation of commodities packed in the box.

In assembling and using a box constructed as described, the end walls are preferably first secured to the end flanges on the bottom walls and the upper pocket flanges thereof turned outwardly. The side wall top side flanges may then be turned outwardly and stapled in such relation to the side walls, whereupon the side walls may be folded upwardly on the side edges of the bottom wall and the vertically arranged end flanges on the side walls turned inwardly relative to each other in overlapping relation to the outer faces of the end walls, the pocket flanges on the end walls, and the upturned flanges on the bottom walls, this relation being maintained by stapling or otherwise securing such elements of the box together.

The box may then be suitably packed with citrus or like fruits, eggs or other commodities, and may then be closed by applying the tuck flange of the closure members to the pockets formed between the pocket flanges on the end walls and the end walls. The closure member having the fastening devices on the folded end thereof is then folded over the open end of the box for seating on the upstanding ends of the end walls.

The other closure member may then be folded in superimposed relation to the first mentioned closure, and a fastening device 35 is then applied to the staples in such a manner as to extend the base thereof through a staple a sufficient distance to effect engagement of the body of the staple between the hook ends of the fastening devices and the body proper of the fastening device.

The fastening device may then be bent substantially at its mid-section and the base end thereof extended through the other staple, whereupon the base end of the fastening device may be bent backwardly upon itself to lock the fastening device in staple-engaging condition. The other fastening device may be similarly arranged in engagement with the other staples to place the box in firmly closed and locked condition.

The operation described in applying the closure members and fastening devices therefor to the box may be reversed to open the box and empty the same of its contents, the box, closures and fastening devices being then capable of reuse, if desired.

It is apparent, therefore, that an economical box of light weight and high efficiency for its intended purpose has been provided by the present invention.

What I claim and desire to secure by Letters Patent is:

1. A box of the character described including, a body member having a bottom wall and pairs of side and end walls, the upper ends of one of said pairs of walls being of greater height than the upper ends of the other pair of walls, the upper edges of said walls of lesser height having outwardly directed exteriorly arranged downturned flanges for bracing said walls, downturned pocket flanges on the upper ends of the walls of greater height, said pocket flanges having secured ends and unsecured lower edges respectively, and closure members each having tuck flanges at one end thereof only removably engageable in the pockets between the pocket flanges and their respective walls, and arranged for substantially coextensive overlapping engagement with each other to form a top wall for the box of double thickness, the lower closure member having seating engagement on the upper edges of both walls of greater height for supporting said closure and allowing ventilation of commodities packed in said box.

2. A box of the character described including, a body member having bottom, side, and end walls, the upper ends of the end walls being of greater height than the upper ends of the side walls, outwardly directed exteriorly arranged downturned flanges on the upper ends of the oppositely disposed pair of end walls, said end walls having hand holes provided with upper edges adjacent the lower edges of said downturned flanges, said downturned flanges having secured ends and unsecured lower edges respectively, and closure members having tuck flanges engageable between said end walls and the downturned flanges thereon in reinforcing relation to edges of said hand holes and having portions arranged for substantially coextensive overlapping engagement with each other to form a top wall for the box of double thickness, the lower closure member having seating engagement on the upper edges of both of the end walls.

JAMES F. CLEARY.